United States Patent
Waghmare et al.

(10) Patent No.: US 9,357,083 B2
(45) Date of Patent: May 31, 2016

(54) SYSTEM AND METHOD FOR PROVIDING USER LIFECYCLE MANAGEMENT AND SERVICE ORCHESTRATION OF MULTIPLE MEDIA SERVICES ACROSS MULTIPLE DISPLAY SCREENS

(75) Inventors: Gemini Waghmare, Toronto (CA); Jingyu Wang, Markham (CA); Jay Deen, Toronto (CA); Leor Rosenberg, Maple (CA); Lucia Rozborova, Toronto (CA)

(73) Assignee: UXP Systems Inc., Toronto (CA)

( * ) Notice: Subject to any disclaimer, the term of this patent is extended or adjusted under 35 U.S.C. 154(b) by 330 days.

(21) Appl. No.: 13/536,685

(22) Filed: Jun. 28, 2012

(65) Prior Publication Data

US 2013/0104206 A1    Apr. 25, 2013

Related U.S. Application Data

(60) Provisional application No. 61/549,967, filed on Oct. 21, 2011.

(51) Int. Cl.
*G06F 21/00* (2013.01)
*H04L 9/32* (2006.01)
*H04M 15/00* (2006.01)

(52) U.S. Cl.
CPC ............ *H04M 15/70* (2013.01); *H04M 15/755* (2013.01); *H04M 15/765* (2013.01); *H04M 15/7652* (2013.01); *H04M 15/7655* (2013.01); *H04M 15/80* (2013.01)

(58) Field of Classification Search
USPC ........................................ 726/5–8
See application file for complete search history.

(56) References Cited

U.S. PATENT DOCUMENTS

| | | | |
|---|---|---|---|
| 7,982,615 B2 | 7/2011 | Kennedy | |
| 2006/0095471 A1 | 5/2006 | Krikorian et al. | |
| 2006/0271381 A1* | 11/2006 | Pui | G06Q 10/06311 705/7.13 |
| 2008/0229396 A1* | 9/2008 | Bodepudi | H04L 63/08 726/4 |
| 2011/0158408 A1* | 6/2011 | Draznin | 380/270 |
| 2011/0182561 A1 | 7/2011 | Bae | |
| 2013/0144727 A1* | 6/2013 | Morot-Gaudry | G06Q 30/02 705/14.72 |

OTHER PUBLICATIONS

A new MAC scheme in cognitive network for different priority of secondary users, Wang et al, IEEE, 2010.*

* cited by examiner

*Primary Examiner* — Luu Pham
*Assistant Examiner* — Jahangir Kabir
(74) *Attorney, Agent, or Firm* — Brett J. Slaney; Blake, Cassels & Graydon LLP

(57) ABSTRACT

A system and method are provided for enabling personalization and service coordination of media services across multiple devices. The method comprises providing a first module to interface with information technology infrastructure and media services provided by an operator or third parties; and providing, using the first module, service orchestration and user lifecycle management components to enable authorized and personalized access to multiple network operator services across multiple devices and services.

19 Claims, 11 Drawing Sheets

SYSTEM AND METHOD FOR PROVIDING USER LIFECYCLE MANAGEMENT AND SERVICE ORCHESTRATION OF MULTIPLE MEDIA SERVICES ACROSS MULTIPLE DISPLAY SCREENS

This application claims priority from U.S. Provisional Application No. 61/549,967 filed on Oct. 21, 2011, the entire contents of which are incorporated herein by reference.

TECHNICAL FIELD

The following relates to systems and methods for providing user lifecycle management and service orchestration of multiple media services across multiple display screens.

DESCRIPTION OF THE RELATED ART

Telecommunications and cable operators may offer their services for consumption on a number of devices, including smart phones, tablet computers, personal computers and televisions. These services may include, without limitation, video, video-on-demand, messaging (voice and text), voice and video calling, voice and video conferencing, home monitoring, etc. Traditionally, individuals consumed these telecommunications and cable operator services on specific individual device types. For example, text messaging has been commonly limited to mobile phones. These specific device types, which may include wireless phones, home phones, television set-top-boxes, and home monitoring consoles, are provisioned with credentials enabling the paying subscribers to access the specific services associated with these devices.

Currently, the source billing systems that verify the good standing of a paying subscriber, generally ties an account with subscribed services to a particular device instance (e.g., a wireless phone number), or to a household (e.g., a television or home phone subscription). One billing account may have several subscribed services, accessed by several individuals. Conversely, a specific individual may have access to a set of services that are subscribed under several different billing accounts. This creates, what can be, a relatively complicated many-to-many account to subscription, and subscription-to-individuals model.

Further complicating the many-to-many accounts to subscriptions and subscriptions-to-individuals model, certain subscriptions such as video packages (e.g. for television services), home phone services, and home monitoring services, may be consumed by several members in a household on a single subscription. These services are often referred to as "household" services. Other services such as those offering wireless voice and data services are typically consumed by single individuals. These services are often referred to as "personal" services.

SUMMARY

It has been recognized that as individuals increasingly consume both household and personal services on multiple devices, a level of personalization is required that can authenticate a single user, or individual (or pseudo-user) to their specific set of household and personal services on any screen, or device. For example, an individual may want to access their personal wireless messaging service, their household TV service, and their household home phone service, across a PC, a tablet computer and a smart phone, in an integrated and seamless way. Moreover, the individual may want to do so in a manner that simplifies the user experience, eliminating the need to provide multiple sets of authentication to the services, and provides the good standing of these services by giving the billing subscription details across one or more accounts.

To address the above problems, the different subscribed services and service credentials may be federated across all relevant billing accounts and associated to a specific user, a process commonly referred to as federated identity or federated user management.

It has been found that in a network operator environment, federated identity management systems traditionally only provide an association between individual identities and profile information and a set of associated services, service credentials and service preferences. These federated identity management systems do not further implement an integrated mechanism to maintain real-time or frequent information exchange between network operator billing account and network operator service systems, to ensure the ongoing validity, or coherency of subscription credentials. Such federated identity management systems also do not implement an integrated mechanism to maintain service-specific data, to ensure that an individual's user experience across devices, screens and households/locations remains consistent, from one device or screen, to the next.

The following addresses these drawbacks by providing a user lifecycle management and multiservice orchestration engine which is adapted to enable the delivery of a wide range of cable, telecommunications and third party services in a personalized and authorized manner across multiple screens and devices.

In one aspect, there is provided a computing platform and framework that utilizes a user lifecycle management and service orchestration system (ULSO). The ULSO comprises a service orchestration component and a user lifecycle management component, which work together to enable a seamless, authorized, and personalized user experience of multiple network operator services across multiple screens and services.

The platform may be used to create multiple users associated with an existing telecommunications or cable operator subscription billing account, whereby the multiple users retain a permanent association with the pre-existing telecommunications or cable subscription account.

In another aspect, a data model is provided, which comprises a user, an operator and third-party services, a personal profile and preferences, session state, authentication credentials and digital signatures of each user or pseudo-user.

The user and its associated operator and third party services, personal profiles and preferences, session state, authentication credentials and digital signatures may be modeled by accessing existing data structures resident in telecommunications and cable operator customer care, billing and network service systems.

The computing platform may also be configured to maintain the coherency of credential and service information between the user lifecycle management component and the existing data structures of a telecommunications and cable operator customer care, billing and network service systems, such as voice, video, messaging, address book, home management, and other $3^{rd}$ party non-operator systems.

The computing platform may achieve the coherency of credentials using the service orchestration component by verifying on an ongoing basis, the authentication and billing account credentials associated with a user while the user is consuming operator and/or third party services across one or more screens.

In another aspect, the ULSO may use user lifecycle management and service orchestration components to maintain the session state of an user for any service the user consumes, as the user consumes that service, in order to allow the resumption or synchronization of a service experience as the user moves from screen to screen.

The computing platform may also employ performance efficient digital signatures to periodically monitor the credential coherency and the session coherency of user across multiple screens.

The computing platform may also include an ULSO console on, or in association with, each device, which includes client-side user lifecycle management and service orchestration components to provide credential and/or session coherency while a user is not connected to the operator network or service. The user lifecycle management and service orchestration components, both device/client and server side, are also configured to perform similar operations when the user is online and thus connected to the operator network.

The ULSO may also be configured to utilize an application programming interface (API) to enable multiple disparate operator network and $3^{rd}$ party services to be supported by the user lifecycle management and service orchestration components, therefore creating a user experience framework for multiple applications across disparate screens. The API may be operable to decompose operator network service capabilities and recompose the service capabilities in the user experience framework, enabling combinations, or "mash-ups" of network operator services.

There is provided a method of enabling user lifecycle management and service orchestration of media services across multiple devices, the method comprising: providing a first module to interface with information technology infrastructure and media services provided by an operator or third parties; and providing, using the first module, service orchestration and user lifecycle management components to enable authorized and personalized access to multiple network operator services across multiple devices and services.

There is also provided a method of enabling session coherency for a media service, the method comprising: receiving at a first module, an activity detected by a second module during use of the media service, the second module being provided on a first device operable to consume the media service, the second module for interfacing between applications on the first device and the first module; the first module storing the activity in association with a profile for user authenticated to access the media service; receiving at the first module, a request from another instance of the second module on a second device to resume consumption of the media service on the second device, the other instance of the second module for interfacing between applications on the second device and the first module; authenticating the user in association with the second device; obtaining the activity stored with the profile; and providing the activity information to the third module to enable the media service to resume according to the activity detected on the second module.

There is also provided a method of enabling credential coherency for a user accessing media services using multiple devices, the method comprising: receiving at a first module, a first digital signature on a change to the user; comparing the first digital signature to a second digital signature accessible to the first module, the second digital signature having been generated in association with the user at a previous time; and if a discrepancy is detected between the first and second digital signatures, resolving the user profile to reflect the change to the user.

There is also provided computer readable media and systems configured to perform the above methods.

BRIEF DESCRIPTION OF THE DRAWINGS

Embodiments will now be described by way of example only with reference to the appended drawings wherein.

DETAILED DESCRIPTION

Figure 1:
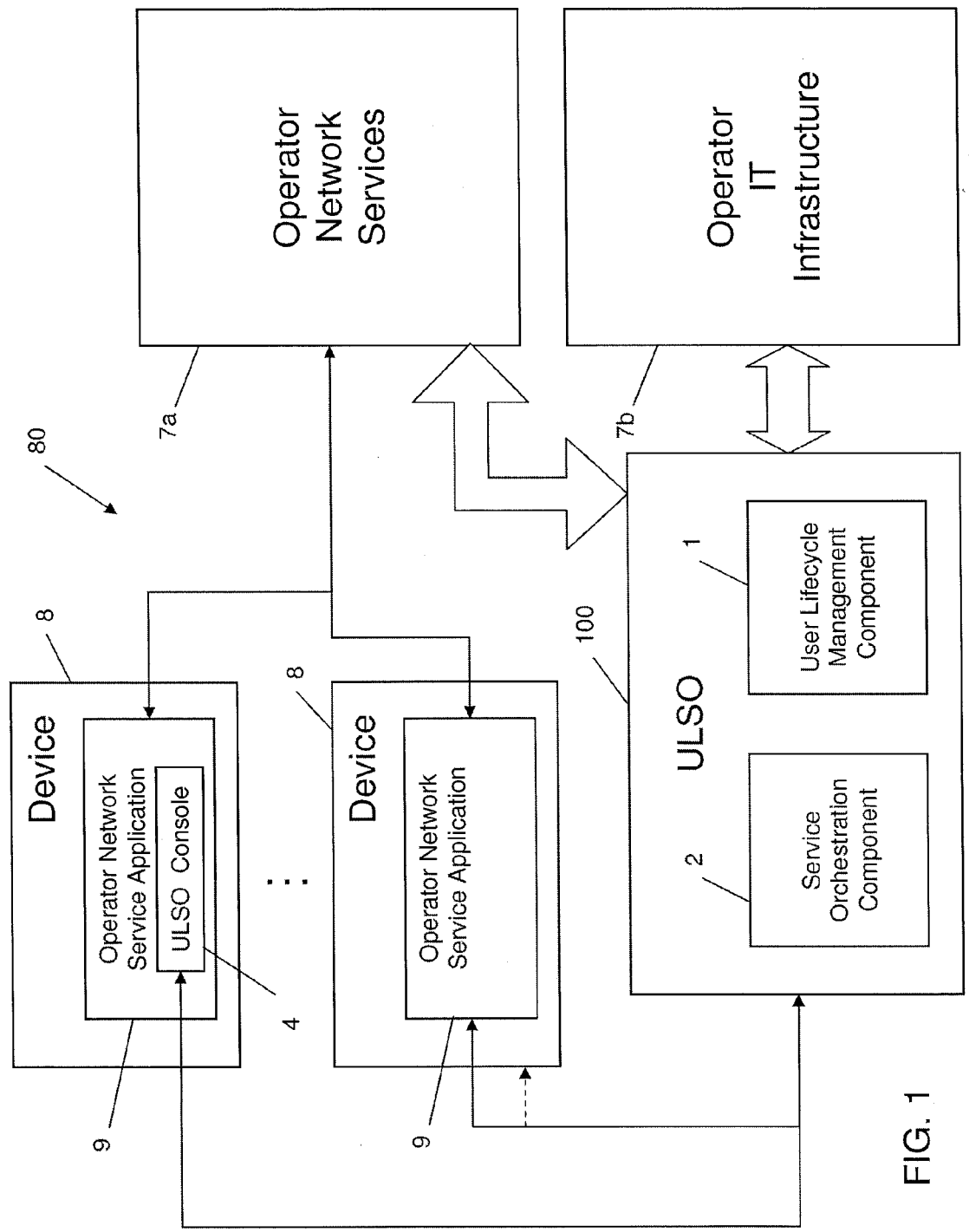
FIG. 1 is an example configuration for a computing platform comprising a user lifecycle management and service orchestration system (ULSO).

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Turning now to the figures, FIG. 1 illustrates an example of a computing framework or platform 80 for providing user lifecycle management and service orchestration of media services across multiple screens. The computing platform 80 comprises a user lifecycle management and service orchestration system (ULSO) 100, which is operable to interact with an operator information technology (IT) infrastructure 7b and the operator network services 7a provided thereby to enable user management and service orchestration across multiple device screens seamlessly to maintain session and credential coherency. The ULSO 100 comprises a service orchestration component 2 to manage and orchestrate such a seamless multi-screen experience, and user management component 1 to manage, authenticate, and maintain the coherency of a user's credentials. Hereinafter a user will refer to an individual, or other entity that consumes media services, whether personally, through a household, or otherwise.

The computing platform 80 also comprises, in at least one device 8, a ULSO console 4 which may be embedded or otherwise associated with an operator network service application 9 on such devices 8. The ULSO console 4 enables each device to obtain and consume media services provided by the operator network on its associated device 8 while maintaining session and credential coherency, in particular in offline scenarios as discussed below. This also enables a user to seamlessly consume any given service across multiple devices 8 in a consistent fashion. As shown in FIG. 1, the ULSO 100 may also be utilized by devices 8 not having or requiring an ULSO console 4. For example, devices 8 that include a web-interface may be capable of accessing both the operator network service 7a and the ULSO 100 via the web-interface. It can be appreciated that such devices 8 may or may not utilize an operator network service application 9 residing on the device 8. For example, if the network service is accessed through a web browser, the ULSO 100 can be accessed directly through the web browser.

Figure 2:
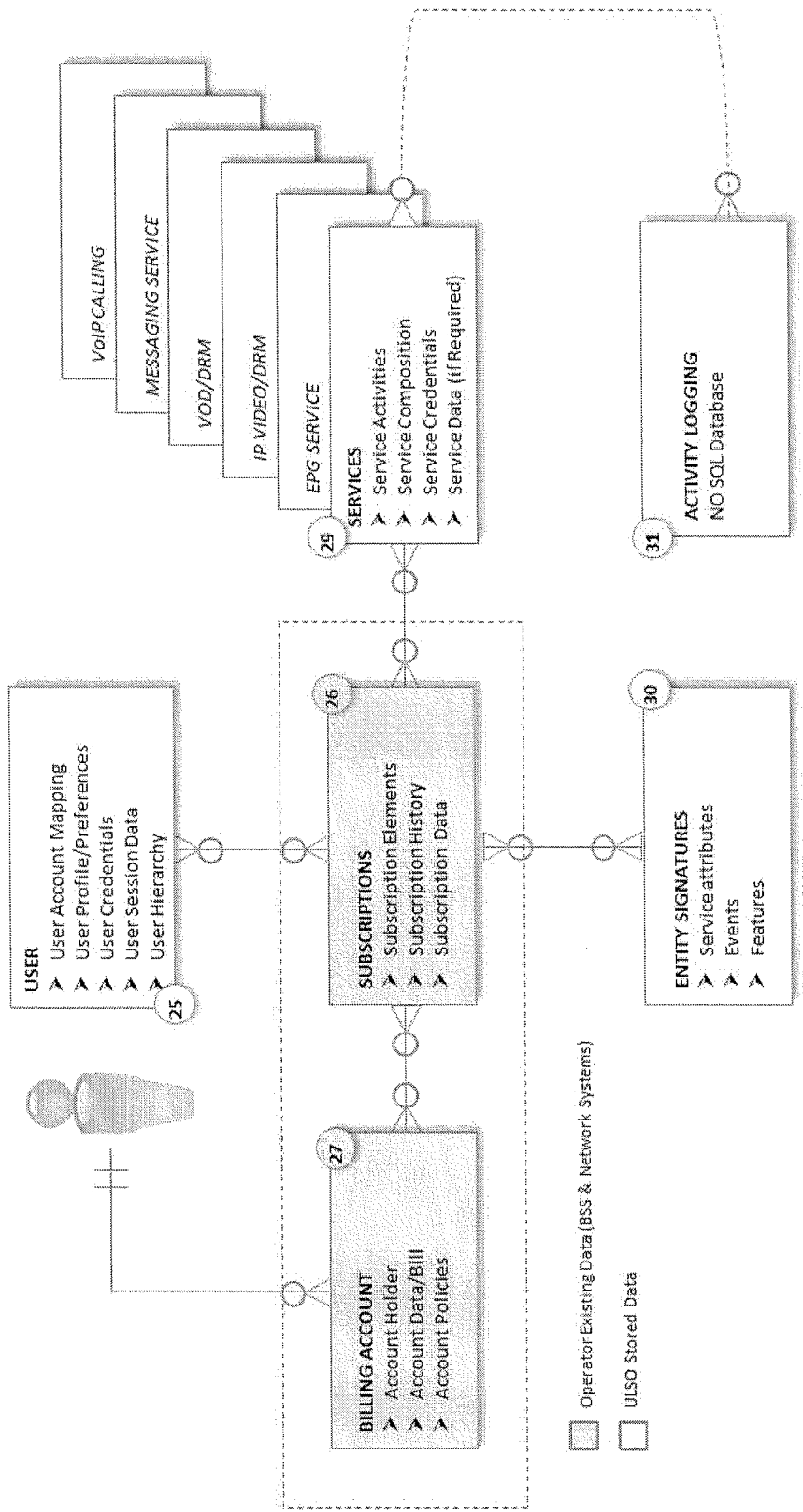
FIG. 2 is an example data model used by the computing platform.

FIG. 2 illustrates a data model that may be utilized by the computing platform 80. The data model utilizes a user 25 as the central entity of the data model, around which the personalized services of the user are associated. The computing platform 80 employs service orchestration and user lifecycle management to create a persistent association between the operator's billing account data 27, which resides in, and is controlled by, the operator billing systems, and the underlying service subscription information 26 of the user. This enables the computing platform 80 to associate the specific service subscriptions that are relevant for that user 25. The data model shown in FIG. 2 provides, for each user 25 and associated subscription 26, a service model 29 that contains the service specific data for the individual user experience. Each network operator service may have its own service model 29, and the data model can be made extensible to accommodate new services as the operator adds them to a portfolio of offerings. The services utilize an activity data store 31 to hold aggregated service usage data. Data entity signatures 30 are generated by the service orchestration component 2, and can be associated with each user in order to maintain session and credential coherency. Activities and events logged by the service orchestration component 2 against each individual user are stored in the activity data store 31. As shown in FIG. 2, the activity data store 31 may comprise an NO SQL database.

Figure 3:
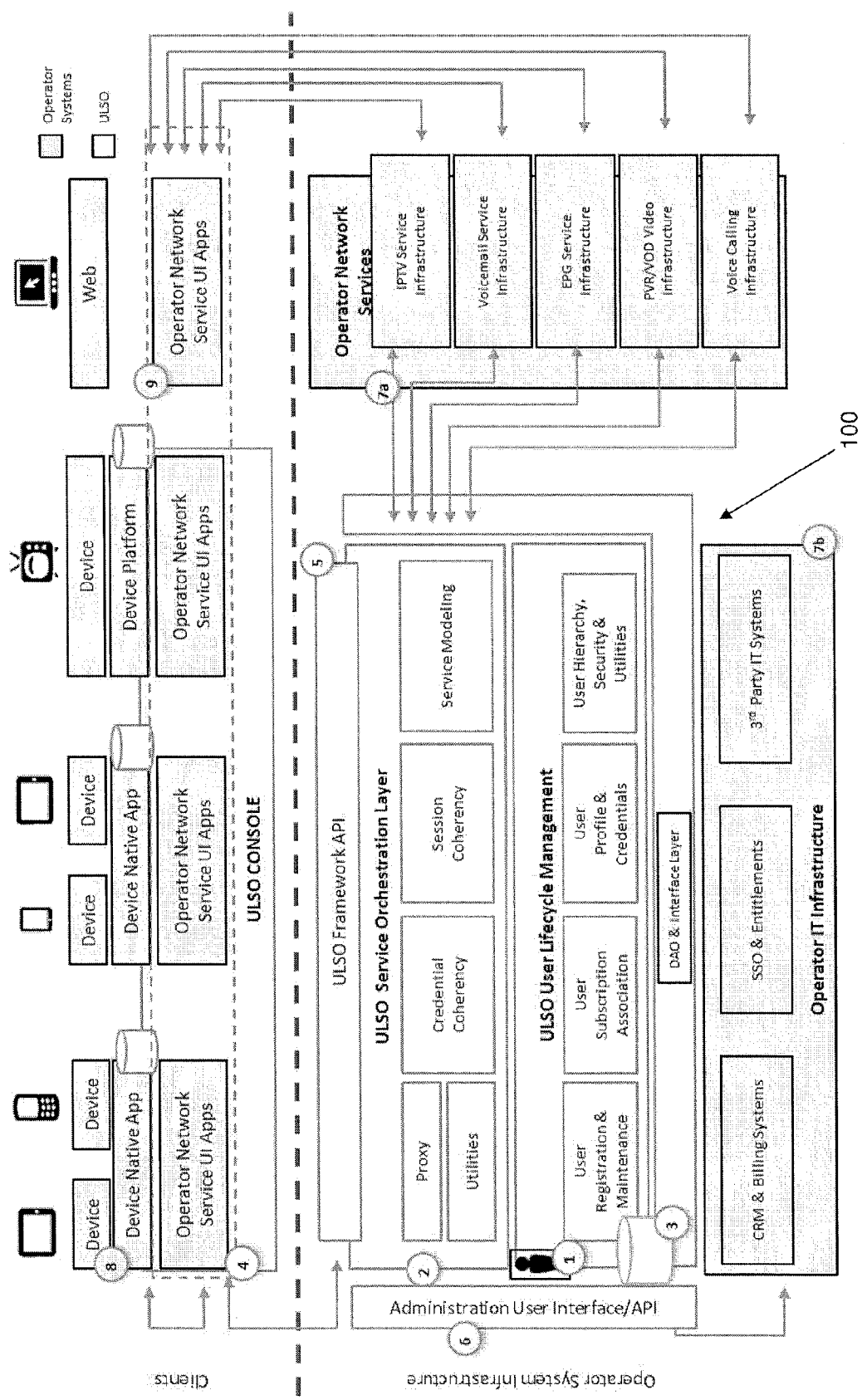
FIG. 3 is an example configuration of the computing platform when user has access to network services.

Turning now to FIG. 3, further detail of an example configuration for the computing platform 80 is provided. In this example configuration, the ULSO 100 comprises user lifecycle management component 1 for registering and maintaining users and associated profiles and credentials. The user lifecycle management component 1 comprises a user registration and maintenance module for registering and maintaining individual users, an account subscription association module for associating operator account subscriptions and services with particular users, a user profile and credentials module for creating and maintaining profiles and storing credentials, and a security and utilities module.

The ULSO 100 also comprises a service orchestration component 2 for managing credentials and sessions to provide seamless multiple screen experiences. The service orchestration component 2 in this example comprises a proxy and utilities, a credential coherency module for maintaining credential coherency, a session coherency module for maintaining session coherency, and a service modeling module for integrating the operator network service application 9 and the operator network services 7a. The ULSO 100 also comprises a data objects access (DAO) and interface layer 3 to enable the appropriate operator network services 7a to be consumed by the devices 8 via the operator network service applications 9 as explained in greater detail below. The ULSO 100 also includes an administration user interface (UI) and API 6 for interacting with the operator IT infrastructure 7b.

Each device 8 and any native device applications support the ULSO console 4 to enable seamless consumption of the operator network services 7a using the operator network service applications 9 while maintaining session and credential coherency. The ULSO consoles 4 interact with the ULSO 100 via an ULSO framework API 5.

The ULSO 100 interacts with operator systems infrastructure 7a, 7b to enable the devices 8 to consume services such as IPTV and video services, messaging services, voice calling services, video on demand/digital video recording services, electronic program guide services, etc. By providing the administration UI and API 6, the ULSO 100 can also interact with the operator IT infrastructure's CRM and billing systems, SSO and entitlements system, and $3^{rd}$ party IT systems as shown in FIG. 3.

As discussed above, by using the computing platform 8, a telecom or cable operator may offer a household or billing account holder, the opportunity to create multiple users within a billing account, each user having their own set of subscribed services, and further, a set of profiling data specific to that user. The operator may implement a registration process whereby an account holder creates an individual user and associates service subscriptions (and required credentials) to that user by linking these users to their pre-existing billing accounts and specific underlying services. The network operator may also allow third party services, including social media and internet services, to be associated to these users, via a user lifecycle management API. Each user has an associated username and password to allow an individual who logs into any screen/device with their username and password, to access a specific set of operator and third party services that the user should have access to across multiple screens.

It can be appreciated that while the user may use a username and password to access the services associated to it, the required downstream credentials from the associated billing system (e.g., subscription information) and the associated network service system (e.g., service password information) are kept up-to-date and valid as stored within the ULSO 100, to ensure authorized use of a service. Using the computing platform 80 described herein, the service orchestration component 2 ensures this validity, termed hereinafter as credential coherency. If the credentials associated with a specific user lose coherency and result in a scenario where user should not or cannot access a system, the service orchestration component 2 can be used to prevent access to the ULSO 100 until such time that credential coherency is restored.

As discussed above, the service orchestration component 2 is also used to ensure session coherency for a user as the individual user consumes services from one screen and then moves to the next screen and the next screen, etc. The service orchestration component 2, by using a security mechanism such as digital signatures, maintains an ongoing signature of the activities carried out on one screen by a user, and incorporates the context of those activities for the user upon their next screen login. In a typical cable operator example, the service orchestration component 2 would ensure session coherency by logging a time-stamp where a user paused the viewing of a video (or other media asset) on a smart phone, such that the user could resume the video at the exact place of pause upon authentication on another device 8, such as a tablet. The ability of the ULSO 100 to tie session and credential coherency to a user in a network operator environment delivers an integrated computing platform 80 for providing seamless, authorized and personalized service access across multiple screens.

In one example implementation, the user management component 1 and service orchestration component 2 of the ULSO 100 reside in the cable and telecom operator's technology systems architecture. A toolkit may also be provided to enable client-side capabilities, e.g., using an ULSO console 4. While the user is online, the user is connected to the ULSO 100 residing on the operator's infrastructure, ensuring central coordination of session and credential coherency. By implementing user lifecycle management and service orchestration capabilities on the user's devices 8, session coherency and credential coherency are maintained, to the extent possible, even while the user is not online (see also FIG. 8 described below). In this scenario, once a user returns online, the service orchestration component 2 can be used to restore the coherency (or lack thereof) between the offline digital signature created during the offline interaction, and the most prior online digital signature stored by the ULSO 100.

The ULSO 100 and its user lifecycle management component 1 and service orchestration component 2 supports multiple services contained in one user interface container instance (e.g., the ULSO console 4) that is deployed across multiple screens. This would allow the cable or telecom operator to deliver multiple, seamless, personalized services to individuals in an integrated manner, allowing re-use of the ULSO 100 across the entire portfolio offering of services, including video, voice, messaging, home monitoring and other next-generation services.

It can be appreciated that the ULSO 100 may also be used with interactive video services to deliver personalized, seamless multi-screen IP-based television, video-on-demand and electronic program guide services. A user with a profile stored in the ULSO 100 may access subscribed channels, presented in a personalized manner on any screen to which they are authenticated. The ULSO 100 may store in the user profile, a selection of favorite channels, personal reminders to watch TV shows, PVR/DVR recordings, and session data for specific videos, including pause and resume data, tailored to an individual. The ULSO 100 may also facilitate interactive video features including messaging, voting and social media, using other network operator or third party services integrated to ULSO 100. The ULSO 100 may also deliver parental control capabilities to a parent in a household, allowing the control of content viewed by a child user, while releasing any restrictions to content on associated parent users. The computing platform 80 described herein may also link all users to a pre-existing household subscription while allowing an individual personalized profile and experience to individual household members.

The ULSO 100 may also be used with messaging services to enable the retrieval of, and response to, voice and text messages from any device in a consistent manner. A user may have one or more message repositories associated with a profile, and access those repositories upon authentication to the system. The ULSO 100 would assure that the user's credentials for accessing those message stores are current, using the credential coherence methods in the service orchestration engine. The ULSO's session coherence would also ensure that any message handling activities undertaken on one screen or device 8 would be reflected upon the user's next session with another device 8.

The ULSO 100 may be used with voice and video calling services. Cable and telecommunications operators who want to offer calling from a number of devices, including tablets, personal computers and smart phones using one phone number, may implement an ULSO 100 to allow an individual user to authenticate to a virtual phone number and make calls from any device. The ULSO's credential coherence would ensure that the user has the appropriate credentials for making the phone call, while the ULSO's session coherence would create a log of the calling activities from each and every device to ensure that all call history and activity would be viewable from any device 8 regardless of the device's origination or termination of a specific call.

The ULSO may be used with cable and telecom home monitoring services. Cable and telecom operators who offer home monitoring and home control services could allow an individual access to their home monitoring console via any device 8. The ULSO's credential coherence would provide the appropriate assurance of authentication to the home monitoring console, while the ULSO's session coherence would provide the logging of all activities undertaken in order to be able to report a history of home monitoring events to the end user on any device 8.

The ULSO 100 may also be used by the network operator for third party services. Cable and telecom operators may want to offer their customers individualized access to personalized services like social media, e-mail, network address book, personal storage/vault and more services in an integrated way, by leveraging the ULSO 100 to store the third party login and service information and orchestrate the user experience by facilitating login, logout and other session user experience activities.

The ULSO 100 may also be used by the network operator to combine any number of services, including those described above. By deploying a common service orchestration component 2 for multiple services, a network operator's multi-screen user interface may present seamless access to a number of service features in a single user experience process flow.

The ULSO 100 as described herein aims to be fully conformant for adaptation to existing service provider systems, specifically customer care, entitlement, authorization, billing, and network service systems. The user data model shown in FIG. 2 may be extended to accommodate additional data stored by cable, telecom and other over-the-top companies that are relevant for maintaining session coherence and credential coherence.

The following examples illustrate where user based service orchestration may be particularly advantageous.

In a first example, a user has downloaded an on-demand pay per view movie from their local cable operator. This download has occurred on the individual's tablet computer; and the terms of the purchase allow viewing access of the video for anyone associated with the user's billing account (i.e. the "household"), for a period of 24 hours, on any device 8, provided that a user on a device 8 can provide some proof of payment for the video.

The individual in this scenario, it can be assumed, made the purchase by logging into the tablet computer by specifying the user created using the computing platform 80 described herein, which is linked back to the pre-existing cable operator billing account. The service orchestration component 2 ensures the population of the purchased credential to the user, and to other users associated with the billing account who should have similar viewing credentials of that purchased video. In this manner, credential coherence is achieved by the ULSO 100.

The individual proceeds to watch 15 minutes of this video on the tablet, and stops the video. The ULSO 100 applies a digital signature to the user to mark the moment at which the video is paused for that individual. While other members of the household may use their user profiles to access the same video and start it anew (given that their user profiles also have an associated purchase credential), the individual who has paused the video may use the ULSO 100 to authenticate themselves on a separate screen within the 24 hour period, and resume the video at the exact spot at which it was paused. The ULSO 100 would also ensure interfaces to the billing and digital rights management system are used, so that for all users, the rights to view the video would expire upon completion of the 24 hour period.

Using the computing platform 80 described herein, the user who has paused and resumed the video now has the association of that viewing experience associated with his user profile. In this manner, session coherence is achieved. Not only has the ULSO 100 enabled the individual a pause-and-resume experience, but the ULSO 100 can also be used by personalization engines to deliver specific recommendations to that individual, based on that viewing experience.

In another example, a user is able to access their household voice messages on any of their devices 8, by interacting with the ULSO 100 and thus the telecommunications operator's infrastructure 7a, 7b. These devices 8 may include a tablet, a television, a personal computer, etc.; and via an association the user has made, the devices 8 may use the user lifecycle management component 1 of the ULSO 100 to associate the voice message service data and credentials (e.g., voicemail password), while the service orchestration component 2 ensures the session coherency of the data as the user moves from screen to screen, retrieving and checking messages. If the user authenticates to any screen, the voicemail service, and the most recent state of that service can be presented.

In this example, the user downloads their voice messages on their tablet, and deletes several of these messages while offline, e.g. while on a subway train. Upon arriving at home, the end user again logs into their profile, again on the tablet. The service orchestration engine ensures credential coherency and logs them onto the service. Next, the service orchestration component 2, utilizing the digital signatures, acknowledges the lack of coherency in the session logs, created by the offline message deletion. The ULSO 100 then reconciles the session coherency by deleting the appropriate messages.

In this example, it is assumed that prior to log-out, the user changes the password on the voicemail service using the tablet interface. Minutes later, another user that also has access to this voicemail service, authenticates to their network operator user interface using their individual username and password. Immediately after login, the service orchestration component 2 detects a lack of coherency between the voicemail password stored by the network service itself (e.g., the voicemail system) and the user that is still holding the old password. The service orchestration component 2 may then initiate a process for the user to update the password to the current one, thereby restoring credential coherency.

Figure 4:
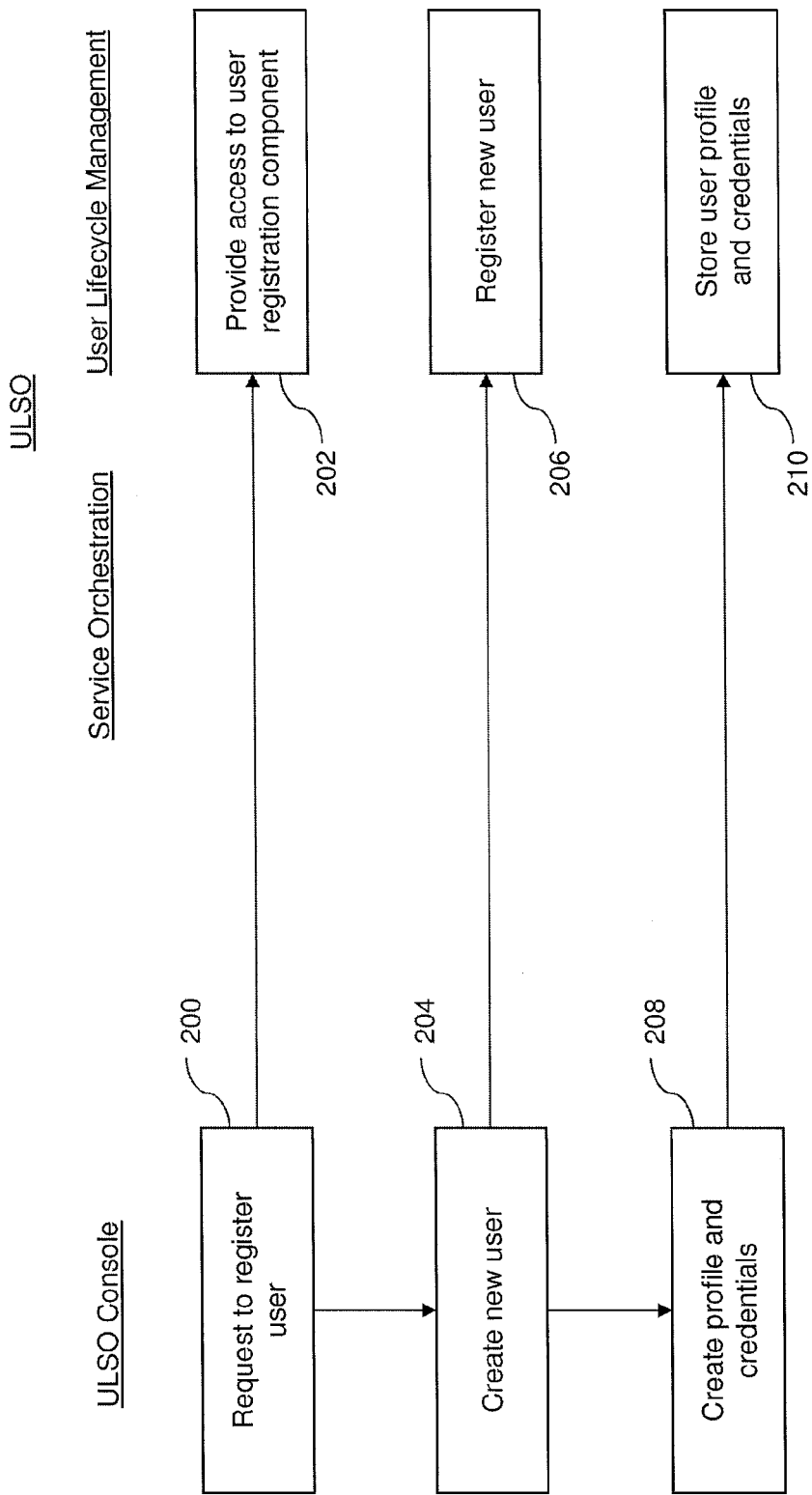
FIG. 4 is an example set of computer executable operations that may be performed in creating a new user.

The ULSO 100 is shown within a cable or telecommunications operator environment in FIG. 3. Using the user lifecycle management component 1, an individual subscriber of the operator's services may create a user or group pseudo-user and associate operator-provided subscribed and other 3$^{rd}$ party services with that user. As shown by way of example in FIG. 4, the individual may use a web or application interface contained within the operator network service application 9 to create a user by requesting to register such a user at 200. The operator network service application 9 uses the ULSO Framework API 5 in order to access the user lifecycle management component's user registration and maintenance component at 202 for the creation of a user. The individual may then create the user at 204, which is registered by the user lifecycle management component 1 at 206. Following creation of the user, the individual may create a profile of information around that user at 208 and have credentials established, e.g., by specifying a name, password(s), preference(s), e-mail address(es), etc. This may be done using the user lifecycle management component's user profile and credentials component and the user profile and credentials are stored by the user lifecycle management component 1 at 210.

Figure 5:
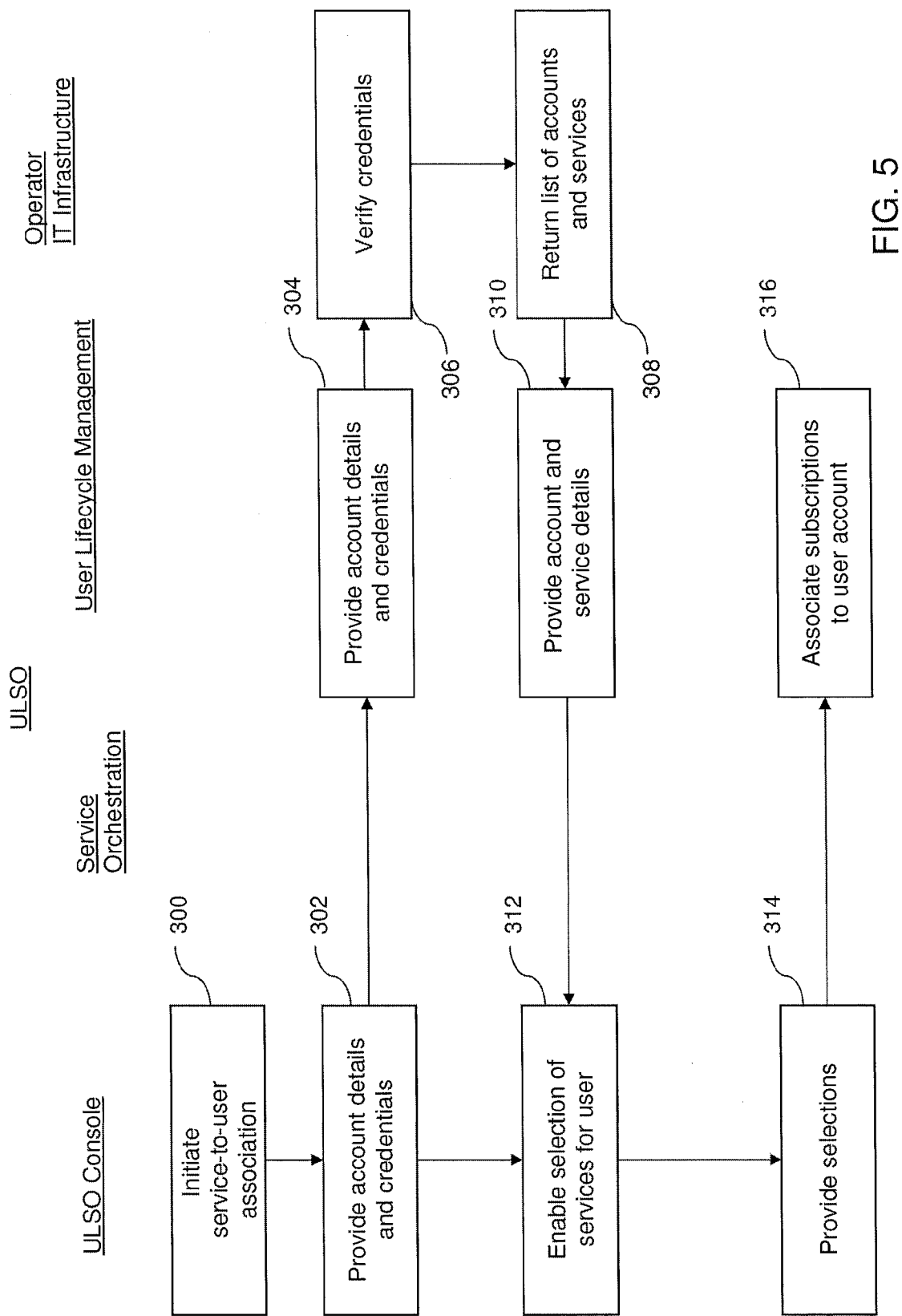
FIG. 5 is an example set of computer executable operations that may be performed in registering services with a user.

Once the creation of the user is complete, the user may associate the user profile to existing services to which the individual is subscribed to, and pays for via the operator, as shown in FIG. 5. The individual may use the ULSO console 4 or operator network service application 9 to initiate a service-to-user association routine at 300. Using the operator network service application 9, the individual passes billing account information at 302 such as the billing account number and other security credentials to the ULSO user lifecycle management layer 1 via the ULSO framework API 5. For the operator services which are billed by the operator CRM & Billing systems, the user lifecycle management layer 1 may also use the DAO and Interface Layer 3 to access the user's relevant billing account or accounts and use the user lifecycle management layer's account subscription association to link the specific subscribed services to that user. The account details and credentials are passed onto the operator billing systems via the DAO and Interface Layer 3 at 304, and also via the Administration User Interface API 6, and the operator IT infrastructure 7b may verify credentials at 306. Having received the account information, the operator billing system returns any found accounts and associated service subscriptions at 308 such as TV subscription or voice service subscriptions to the user lifecycle management layer 1. The user lifecycle management layer 1 then uses the ULSO framework API 5 to provide the account and service details to the operator network service application 9 at 310. The operator network service application 9 then enables the individual to select the services for that user at 312. Using the user lifecycle management layer's account subscription association component, the user can use the operator network service application 9 to select which individual service subscriptions should be associated with that user profile at 314. The subscription details for each user, along with preferences such as parental controls, purchasing authority, personalization details, etc. are stored within the user lifecycle management layer's user profile and credentials component at 316. It can be seen that by using the computing platform 80 described herein, it is possible to create multiple users for any given billing account, or number of billing accounts, in a many-to-many data model.

The service orchestration component's service modeling component integrates with the operator network service application 9 and operator network services 7a of the operator's infrastructure, to provide the individual with access to the specific services that the individual associates against their user profile. Information such as voicemail passwords, video-on-demand passwords and other network service credentials details are associated via the service orchestration layer's service modeling component using the DAO & Interface Layer 3 to attempt to access a service. Once the appropriate credentials are entered, these credentials are also stored in the user lifecycle management component's user profile and credentials component.

Figure 6:
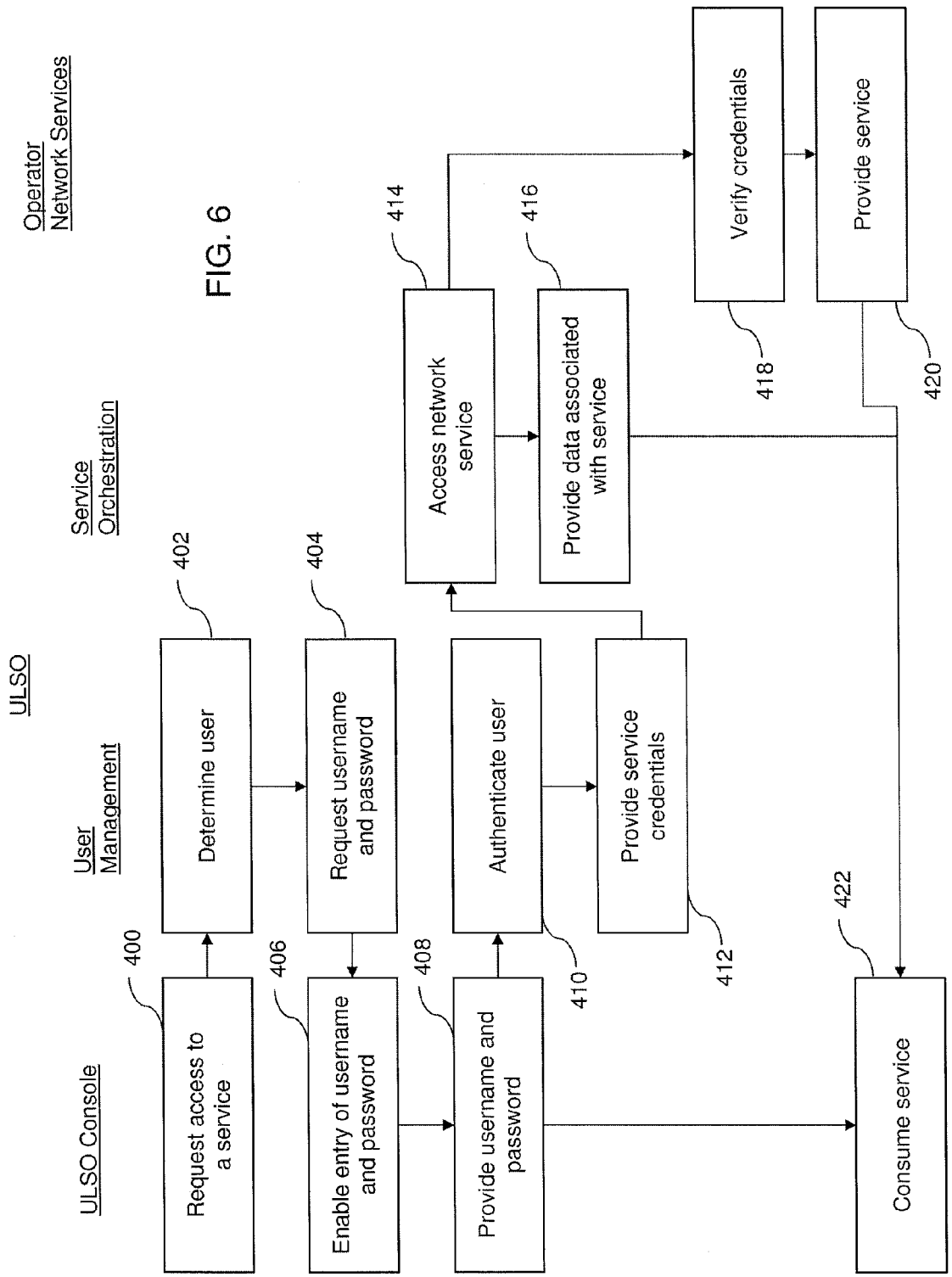
FIG. 6 is an example set of computer executable operations that may be performed in accessing an operator network service.

Turning now to FIG. 6, a user may use the operator network service application 9 on a device 8 to request access to a service at 400. The user lifecycle management component 1 determines the user making the request at 402, and may then return a request to the user at 404 to enter the appropriate authentication credentials for the ULSO 100, such as a username and password. The incorporation of the ULSO console 4 into the operator network service application 9 enables the individual to enter their username and password at 406. This enables the individual to use their associated services in a personalized way. The individual may then be authenticated with the ULSO 100 using the username and password. The username and password are sent to the user management layer 1 at 408 via the ULSO framework API 5. Once authenticated by the user lifecycle management component 1 at 410, the user lifecycle management layer 1 uses the network service credentials stored in the user profile and credentials component at 412 to invoke the service orchestration layer 2 to access the associated network services at 414 using the services subscription and network service credentials. The operator network services 7a may then verify the credentials at 418 and provide the service to the device 8 at 420. The operator network service application 9 may then consume the service at 422. It can also be seen in FIG. 6 that at 416 the service orchestration component 2 may also provide data associated with the service.

For example, in addition to providing the authentication details required for use, once the operator network service application 9 invokes the use of the operator network service 7a as shown in FIG. 3, the service orchestration's service modeling component may assist the operator network service application 9 in accessing the operator network service 7a by providing the operator network service application 9 with the data required to use the network operator service 7a and orchestrating the process by which the operator network service application 9 accesses the network operator service 7a. For example, the service modeling component may orchestrate the process of a VoIP session initiation protocol (SIP) client embedded in operator network service application 9 registering a user to a network operator service VoIP switch in order to make a phone call from any operator network service application 9.

The computing platform 80 also ensures that ongoing access to the user's network operator and third party services are provided on the basis of a valid billing subscription and network service credentials by use of the service orchestration component's credential coherency component. The credential coherency component makes use of digital signatures associated with the user that reflect the billing and the network services credentials required to permit authorized use of the network services. When the user authenticates with the ULSO 100 to obtain their services, and as the user uses these services, the credential coherency component compares digital signatures with the user against digital signatures created by the service orchestration component's service modeling component during the use of the network services. Any mismatch of digital signatures, for example, a mismatch created if the password of a network service stored in the user lifecycle management component 1 cannot gain access to a network service that the service modeling component is attempting to enable for the user via the DAO and interface Layer 3, will result in a coherency mismatch, and a corresponding attempt by the service orchestration component 2 to reconcile the mismatch via a user correction to the password using the ULSO framework API 5 and the operator network service application 9. This method for ensuring credential coherency is enabled across multiple operator network service application 9 simultaneously, via the ULSO framework API 5.

The resulting capability enabled for the individual user using the ULSO 100 as described above is seamless, integrated, multi-screen access to one or more individually associated network operator services while ensuring that the billing subscription and network operator access credentials are intact throughout the user experience.

The computing platform 80 also allows for individual users to use their network operator services 7a across multiple screens via the operator network service application 9 using the service modeling components. A service, such as a video, voice, messaging or other service, is requested for use by a user who has been authenticated using the operator network service application 9 and user management component 1 as described above.

The service orchestration component's service modeling component can decompose the individual capabilities of a network operator service 7a using the DAO and Interface Layer 3. This allows specific network operator service 7a capabilities to be presented to the operator network service application 9 and used via the service modeling component. For example, specific TV show information that is accessed via the service orchestration component 2 using the DAO and interface layer 3 from an EPG system resident in network operator systems 7a can be exposed to any number of operator network service application 9, including a messaging application where an individual wanted to send information about a specific show to another individual via a messaging application that had an integrated TV show data sharing feature.

The computing platform 80 further enables personalization of content for a specific network operator service 7a in addition to personalization of services, using the user lifecycle management component 1 and the service orchestration component 2 in with each other. For example, the user lifecycle management layer 1 can use specific user, subscription and profile information to filter data such as EPG data that is retrieved from the operator network services 7a to show only TV channels and shows subscribed to and preferred by the individual user, and present that specifically personalized information to the end user via the operator network service application 9, using the ULSO framework API 5 and the ULSO console 4.

The computing platform also achieves a seamless experience across multiple operator network service applications 9 by utilizing the service orchestration component's service modeling and session coherency components. As the service modeling component orchestrates the user experience of the operator network services 7a as described above, each activity a user undertakes is logged and stored against the user in the user lifecycle management component 1. In this manner, if an individual terminates an activity on one operator network service application 9, and later authenticates to the system via another operator network service application 9, the service orchestration component 2, using data stored in user lifecycle management layer 1, is able to resume the activity undertaken in the previous operator network service application 9. To achieve this, the service orchestration component's service modeling component informs the operator network service application 9 to restore the operator network service session at given the context of the last interaction as it was stored in the user lifecycle management component 1. This process, shown in FIG. 7 by way of example, illustrates session coherency.

Figure 7:
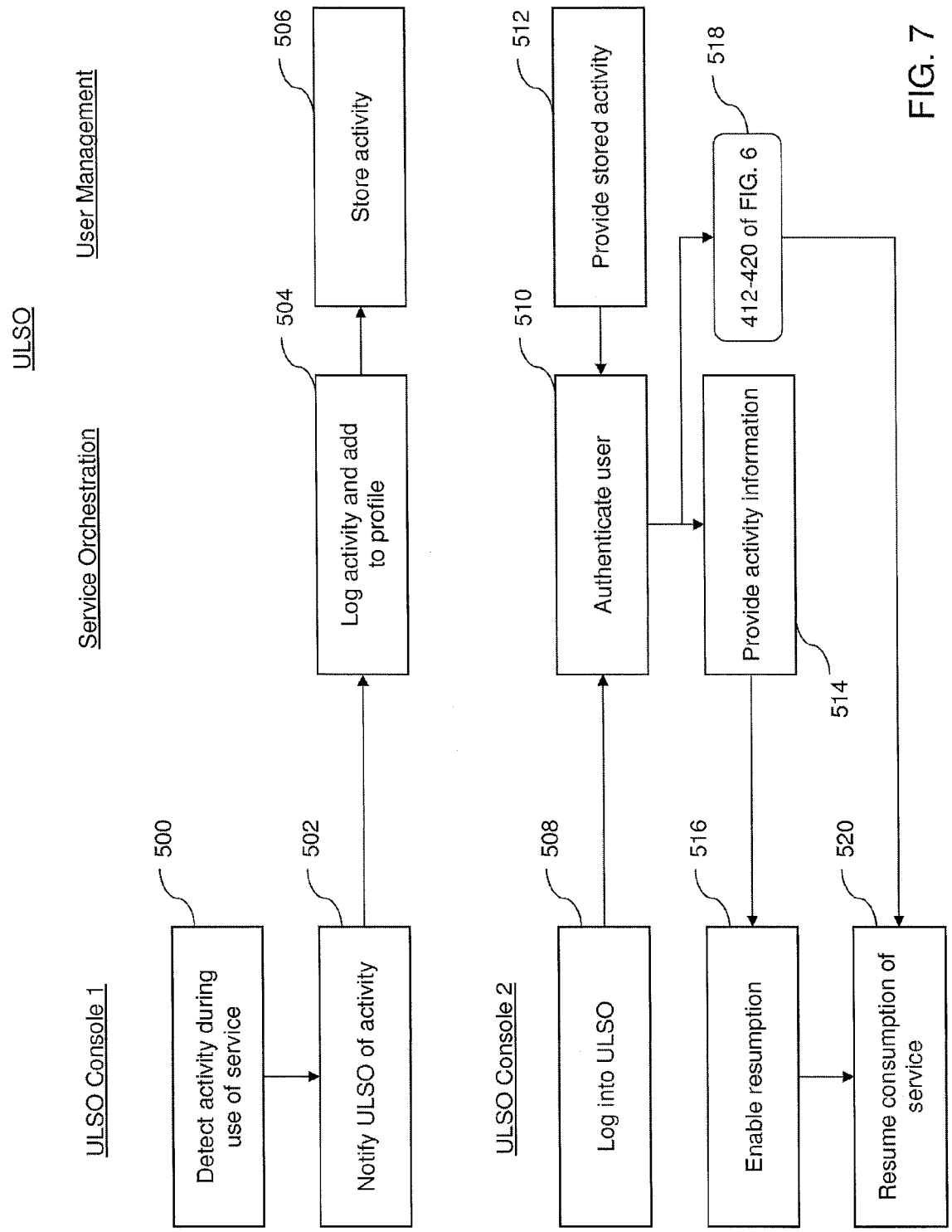
FIG. 7 is an example set of computer executable operations that may be performed by the computing platform in maintaining session coherency.

Turning now to FIG. 7, a first ULSO console 4 at a first device detects an activity during use of a service at 500. For example, the ULSO console 4 may detect via the operator network service application 9 that the individual has paused a video. The ULSO console 4 notifies the ULSO 100 of the activity at 502. The service orchestration component 2 logs the activity and adds this to the profile for the user at 504 by accessing the user lifecycle management component 1 and having the user lifecycle management component 1 store the activity at 506.

At a later time, if the same service is to be resumed on a different device 8, the individual (which may be the same individual or a different individual) may log into the ULSO 100 at 508. The service orchestration component 2 authenticates the user at 510 and obtains the stored activity from the user lifecycle management component 1 at 512. The activity information may then be provided to the operator network service application 9 at 514. The operator network service application 9 then enables the individual that has been authenticated for that user to resume the service at 516. Consumption of the service may then resume at 520. For example, the user may log in on a different device 8 and pick up the video from the same place that it was paused using the previous device 8. It can also be seen in FIG. 7 that the user lifecycle management and service orchestration components 1, 2 may utilize steps 412-420 shown in FIG. 6 to access the network services in order to resume consumption on the next device 8.

It can be appreciated that the computing platform 80 may include additional middleware systems in addition to the infrastructure for the operator network services 7a, the operator IT infrastructure 7b, or other intermediate points between the systems described herein. These middleware systems may serve to aggregate and/or expose data and/or processes resident in the downstream operator systems 7a and 7b in order to reduce the number of integration points in the computing platform 80.

The ULSO console 4 embeds the service orchestration and user lifecycle management capabilities as described herein on the individual's operator network service application 9 in order to store data and manage processes locally on a device that is hosting the operator network service application 9. This allows faster performance and access to personalized services and content even when the individual is not connected to the operator infrastructure and/or is offline. It may occur that an individual user wishes to authenticate to the user lifecycle management component 1 via the operator network service application 9 to carry out some activities related to a network operator service 7a, even when the individual is not connected to the network operator's infrastructure.

Figure 8:
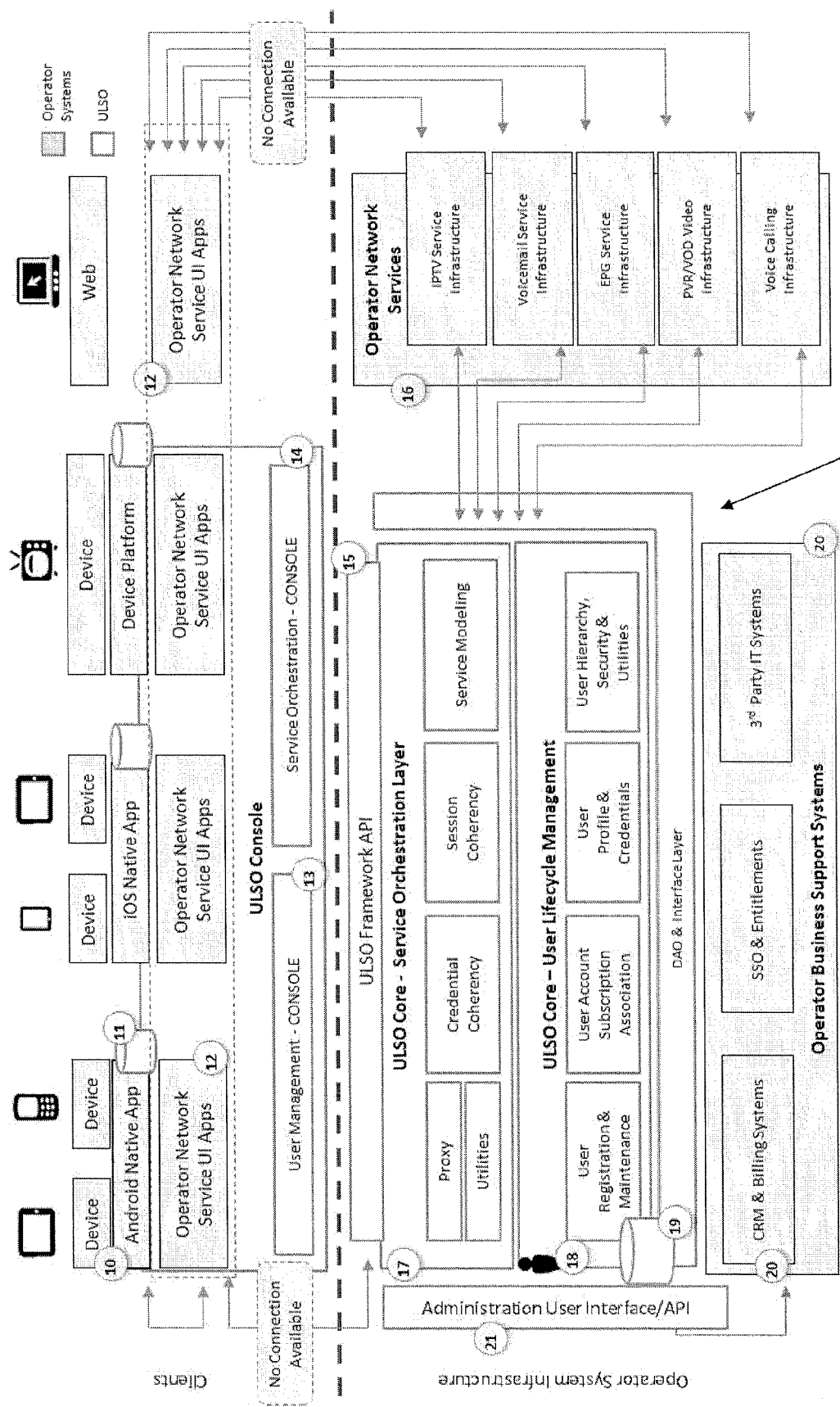
FIG. 8 is an example configuration of the computing platform when a user does not have access to network services.

FIG. 8 illustrates an example configuration of the computing platform 80 when a user wishes to be authenticated by the ULSO 100 to access network operator services 16 but there is no connectivity from the operator network service application 12 to the operator network services 16. In this case, where the operator network service application 12 which are now not connected to the operator network services 16, the user can still perform a number of functions related to the operator network service application 12 that are available offline, such as managing stored voicemails, viewing local EPG data, viewing locally stored video on demand content, etc. In this case, in order to preserve personalization and coherence as detailed thus far, the ULSO console 10 implements user lifecycle management and service orchestration components 13, 14 that reside on the device 8, and provides ULSO 100 functions to the operator network service application 12 via an API.

The user lifecycle management component 13 on the console 10 uses a database 11 to locally store information about the individual's user and preferences. Similarly, the service orchestration component 14 on the console uses the database 11 to log and store all of the user's activities while the individual is offline. In a manner similar to that described above, while the user is not connected to the operator network services 16, the service orchestration component 14 employs digital signatures to capture any session or credential changes during the user's offline interaction. Once online, the ULSO's user lifecycle management component 18 and service orchestration component 17 restore a connection to the console components 13 and 14 via the ULSO framework API 15 and synchronize and reconcile any discrepancies between digital signatures to ensure credential and session coherence. As described above, the administration user interface/API 21 is a user interface and API for the operator or other administrative personnel to view, manage and edit the ULSO 100 and data.

Figure 9:
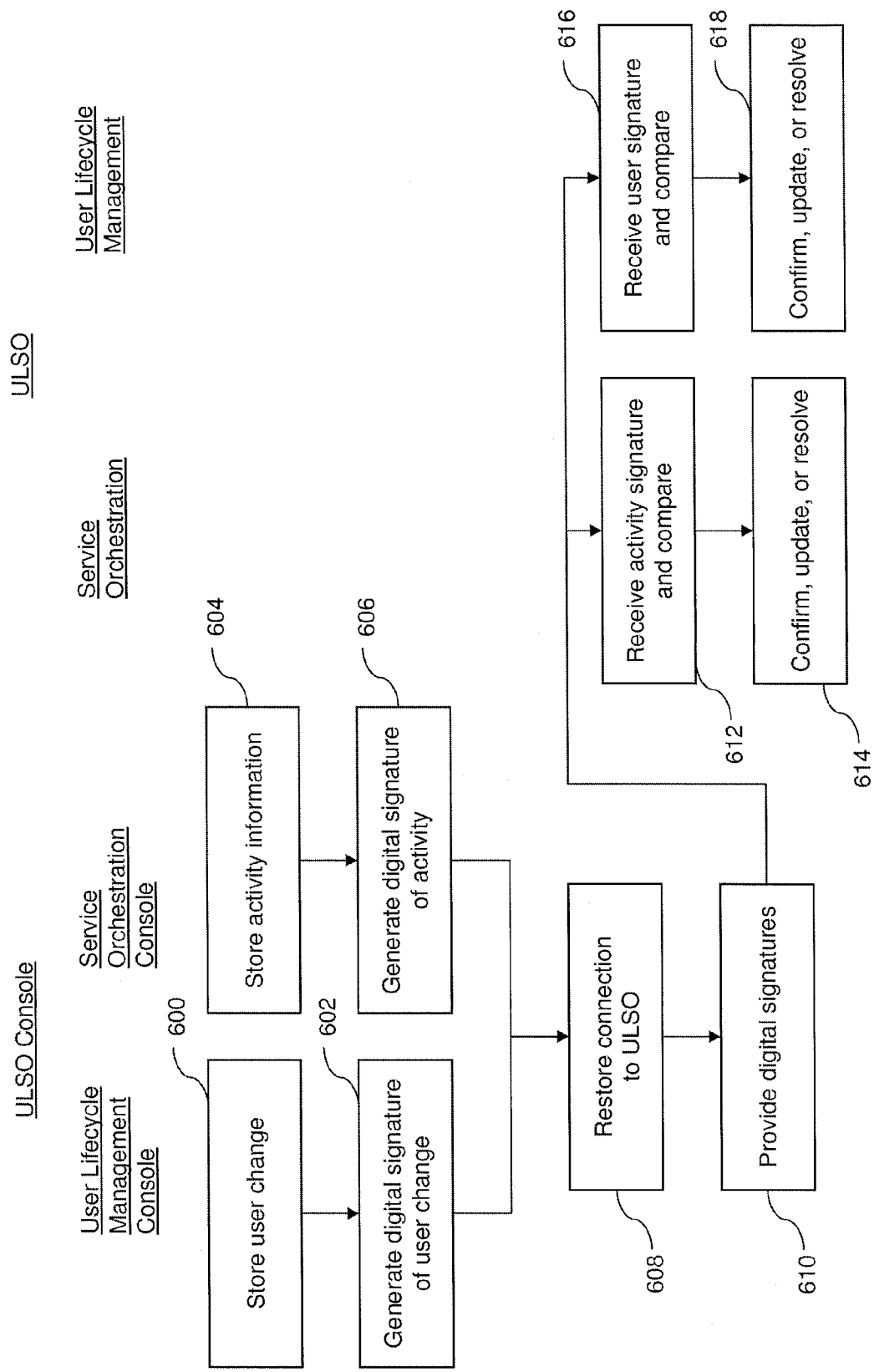
FIG. 9 is an example set of computer executable operations that may be performed by the computing platform to maintain session and user coherency when user performs activities offline.

FIG. 9 illustrates an example set of operations that may be performed by the computing platform 80 in maintaining session and credential coherency when the device 8 is offline. At 600 the user lifecycle management component 13 on the console stores user changes and generates a digital signature of the user change at 602. Similarly, in this example, the service orchestration component 14 on the console stores activity information at 604 and generates a digital signature of the activity at 606. At some later time, the ULSO console 10 restores a connection to the ULSO 100 at 608 and provides the digital signatures at 610. The service orchestration component 17 at the ULSO 100 receives the activity signature and compares it to one(s) previously stored at 612 and confirms the coherency, updates signatures, or resolves mismatches at 614. Similarly, the user lifecycle management component 18 at the ULSO 100 receives the user signature and compares it to one(s) previously stored at 616 and confirms the coherency, updates signatures, or resolves mismatches at 618.

Figure 10:
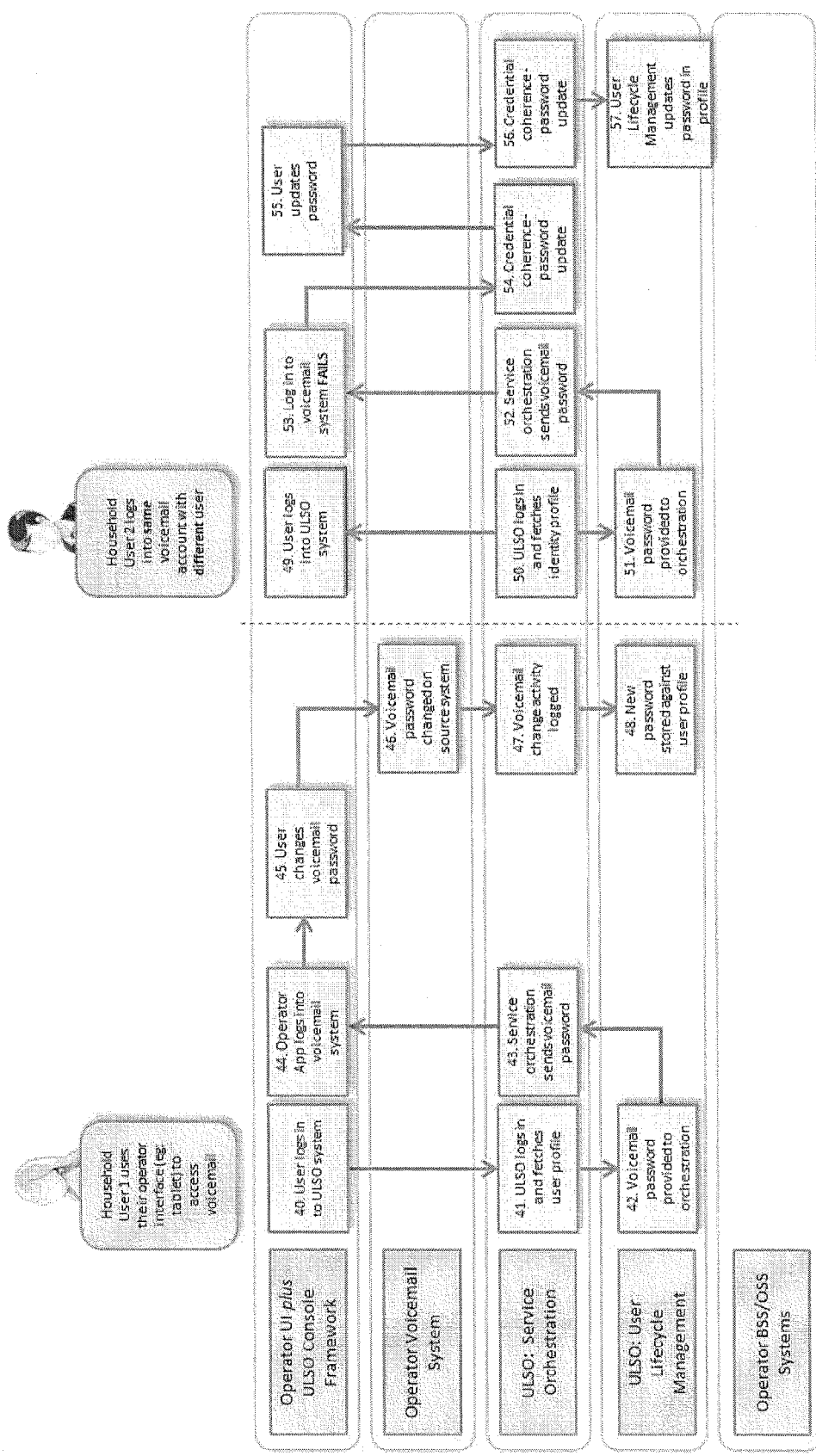
FIG. 10 is an example set of computer executable operations that may be performed in maintaining credential coherency in an example scenario.
Figure 11:
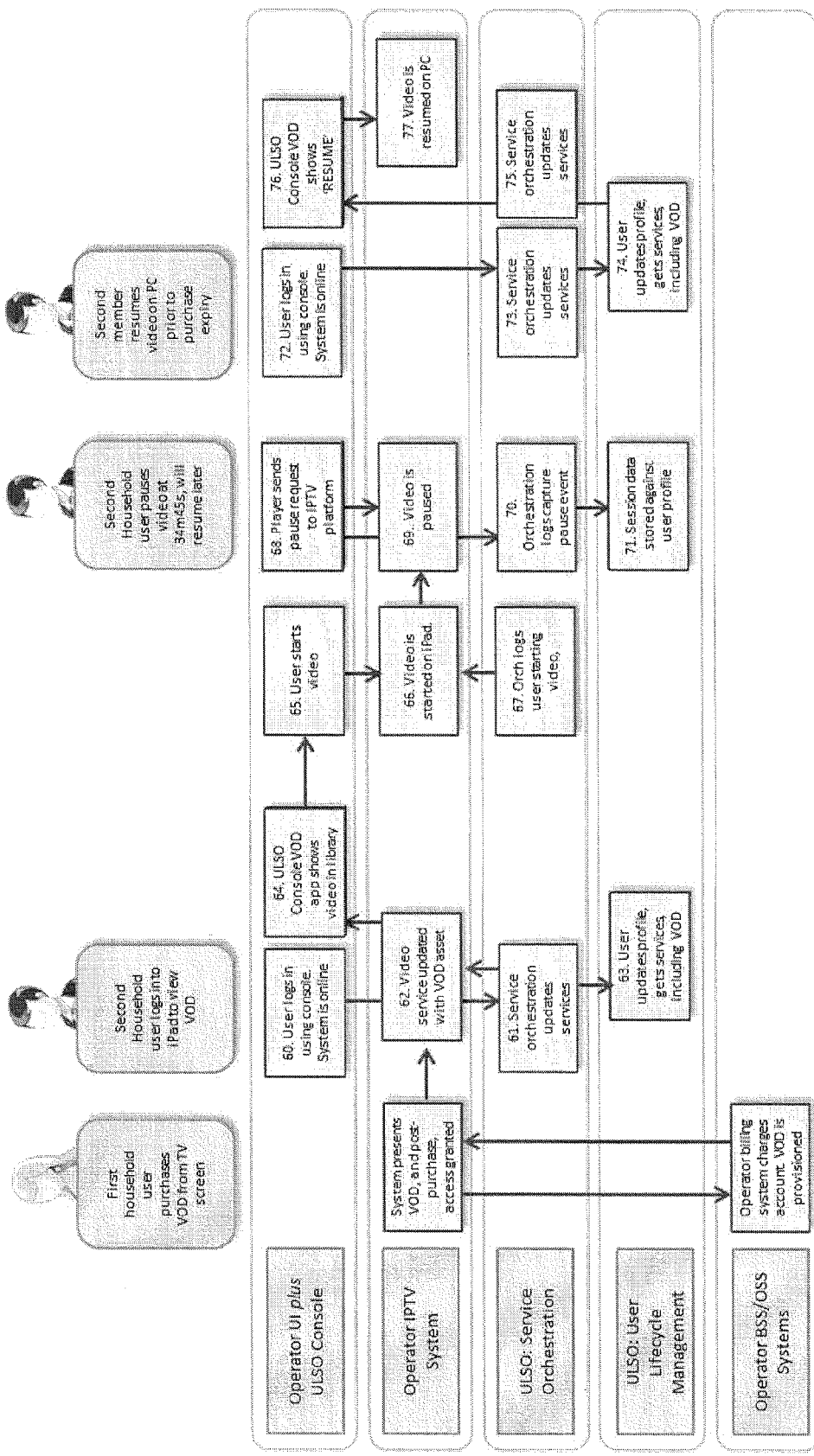
FIG. 11 is an example set of computer executable operations that may be performed in maintaining session coherency in an example scenario.

FIGS. 10 and 11 provide illustrative examples of how the computing platform 80 may operate to ensure credential coherency (FIG. 10) and session coherency (FIG. 11).

As shown in FIG. 10, in order to ensure seamless coherence of credentials as multiple individuals are using the same services across multiple screens, the user lifecycle management and service orchestration components 1, 2 work together in concert in the ULSO 100. The process flow shown in FIG. 10 follows the use of a single voicemail service by two registered users, each of whom has associated a single home phone number and voicemail to their profile. In the process flow step 40, the first household member logs into their ULSO 100 via an operator network service application 9, and has their profile information retrieved via the service orchestration component 2 in step 41, which retrieves it from the user lifecycle management component in step 42. The credentials for the voicemail service, among other credentials, are retrieved and passed via service orchestration component 2 in step 43 to the operator network service application 9 in step 44. Once the user is logged into the voicemail service she may perform any tasks related to that service.

In step 45 of FIG. 10, however, the user changes the voicemail password on the voicemail system using the operator network service application 9.

Credential coherence is required in this process flow when a second household user logs into the ULSO 100 using the operator network service application 9. Similar to the process described in steps 40-44, the user lifecycle management and service orchestration components 1, 2 would normally work in concert to seamlessly log the individual in to his shared voicemail service in steps 49-52. However, due to the password change in step 45, the password credentials passed to the operator network service application 9 in step 52 is incorrect (i.e. the old password) and therefore fails. Here, the operator network service application 9 uses the ULSO framework API 5 to access the service orchestration component 2 in step 54, which initiates a process to the end user in step 55 to update the password with the correct password for login. Credential coherence is achieved as the service orchestration component 2 updates the new password as entered by the second household member in the user lifecycle management profile associated with that individual.

In FIG. 11, a household member has purchased a video-on-demand asset for viewing across multiple screens from a cable operator. In this process flow, in step 60, an individual user with an association to the account that has the associated video asset, logs into the ULSO 100. In step 61, the service orchestration component 2 initiates an update of the services associated with the individual to restore session coherency to that individual. In process flow step 62, the operator IPTV system populates the operator network service application 9 with the missing VOD asset, show in step 64. The service orchestration component 2 also updates the individual's user profile with this service/content data, in step 63.

In step 65, the second user starts the video using the ULSO 100 and the operator network service application 9, and in turn the back end IPTV system begins streaming the video to the operator network service application 9 at step 66. The service orchestration component 2 receives an event notification of the commencement of the video by the second user.

At a certain point during the viewing of the VOD asset, the second user decides to pause the video, in step 68. This event is initiated in the operator network service application 9 which in turn sends an instruction to the IPTV platform to pause the video in mid-viewing. The ULSO console 4, integrated with the operator network service application 9, sends a corresponding instruction in step 70 with log details of the point in time at which the video was paused. This pre-supposes that the IPTV infrastructure is able to send such information to the ULSO 100, or an alternate method of sending the time stamp of the video to the ULSO 100 is available. In step 71, the user lifecycle management component 1 receives the session data of the VOD viewing event from the service orchestration component prior to logging the user out of the ULSO 100.

At some point in the future, assuming the video asset is still available to the household per the terms of the purchase, the second household user is authenticated by the ULSO 100 at step 72, on a device 8 that is different than the one used in steps 60-71. As before, the service orchestration component 2 updates the services available to the end user and the user profile to the operator network service application 9, in steps 73 and 74. This update includes the information related to the user pausing the video referred to in this process flow. The information retrieved from the user lifecycle management component 2 containing this VOD session information is sent to the operator network service application 9 in step 75 and presented to the user via the operator network service application 9 in step 76, at which point the option to resume the video is presented to the individual user. The user may then choose to resume the video. If they do so, the operator network service application 9, informed by the inventions service orchestration component 2, is able to initiate the resumption of the video via the IPTV infrastructure in step 77.

It can be appreciated that the service orchestration and user lifecycle management components 2, 1 may be used as described in steps 60-77 for any number of operator or third party services, such as voice calling, messaging, social networking, e-commerce and more, to enable a coherency of the user's personal session as they move from screen to screen, permitting a user experience to continue seamlessly as an individual moves from device to device.

The steps or operations in the flow charts and diagrams described herein are just for example. There may be many variations to these steps or operations without departing from the principles discussed above. For instance, the steps may be performed in a differing order, or steps may be added, deleted, or modified.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the computing platform 80 or accessible or connectable thereto. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

The invention claimed is:

1. A method of enabling user lifecycle management and service coordination of media services across multiple devices, the method comprising:

providing an intermediary device between a plurality of media services provided by at least one of a network operator and one or more third parties, and electronic devices configured to utilize the plurality of media services;

interfacing the intermediary device with the electronic devices to determine individual user identities permitted to utilize corresponding media services according to existing account subscriptions for the media services;

interfacing the intermediary device with at least one network operator entitlement or billing system to determine the existing account subscriptions for the media services;

interfacing the intermediary device with the plurality of media services to connect the plurality of media services to particular electronic devices according to permissions within groups of user identities under the same existing account subscription, determined by the intermediary device, without affecting the existing account subscriptions;

providing, using the intermediary device, service orchestration by managing media service sessions for the user identities independent of the electronic device being used; and providing, using the intermediary device, user lifecycle management for managing profiles and credentials for the groups of user identities tied to the same existing account subscription, authorizing and personalizing access to the media services for multiple individuals under the same account, across multiple devices without affecting the existing account subscriptions, wherein providing user lifecycle management comprises:
- determining roles for the individual user identities in the groups, in the context of the existing account subscriptions, and storing the roles in the context of the existing account subscriptions;
- authorizing the creation of new user identities by the primary account holder in the group, in the context of the existing account subscriptions, and storing the new user identities, without affecting the existing account subscriptions;
- verifying that an identity of a user requesting access to media services matches the stored individual or new user identities and is either a primary account holder or has been indicated as being granted access to the requested media services held in that account by the primary account holder; and
- upon a successful verification, authorizing the requesting user and granting access to the requested media services.

2. The method of claim 1, wherein authorizing the requesting user comprises:
- receiving at the intermediary device, a request to access a media service;
- determining a user identity;
- requesting entry of user credentials;
- receiving the user credentials at the intermediary device;
- authenticating the user credentials; and
- providing service credentials to an operator network service to provide access to the requested media service.

3. The method of claim 1, wherein authorizing the creation of new user identities comprises:
- enabling the intermediary device to register user identities;
- receiving a request to create a new user identity; and
- registering the new user identity.

4. The method of claim 3, further comprising enabling a profile and credentials to be established for the new user identity, and storing the profile and credentials for the new user identity.

5. The method of claim 1, further comprising:
- receiving account details and media service credentials;
- verifying the account details and the media service credentials with an associated network operator;
- enabling the creation of at least one user identity associated with an operator account;
- enabling the selection of at least one media service to be associated with a user identity receiving at least one media service selection; and
- associating at least one service subscription with the user identity.

6. The method of claim 1, wherein user information and session data are digitally signed to enable comparison of stored digital signatures with new digital signatures generated during different sessions.

7. The method of claim 1, wherein the network operator is any one or more of a communications organization, and a media organization.

8. The method of claim 7, further comprising interfacing with the existing entitlement or billing system to coordinate consumption of the media services with the existing account subscriptions.

9. The method of claim 1, wherein the user identity is using an application on an electronic device in an online or offline mode, the method further comprising:
- providing a module on at least one device for interfacing between a device-based application and media services on the devices, and the intermediary device;
- enabling the module to communicate with the intermediary device and to have the module retrieve and store session and user profile data from the intermediary device for at least one service pertaining to an account with the network operator; and
- enabling the module to communicate with the intermediary device and to have the module send session and user data from the intermediary device.

10. A non-transitory computer readable medium storing computer executable instructions for enabling personalization and service coordination of media services across multiple devices, the computer executable instructions comprising instructions for:
- providing an intermediary device between a plurality of media services provided by at least one of a network operator and one or more third parties, and electronic devices configured to utilize the plurality of media services;
- interfacing the intermediary device with the electronic devices to determine individual user identities permitted to utilize corresponding media services according to existing account subscriptions for the media services;
- interfacing the intermediary device with at least one network operator entitlement or billing system to determine the existing account subscriptions for the media services;
- interfacing the intermediary device with the plurality of media services to connect the plurality of media services to particular electronic devices according to permissions within groups of user identities under the same existing account subscription, determined by the intermediary device, without affecting the existing account subscriptions;
- providing, using the intermediary device, service orchestration by managing media service sessions for the user identities independent of the electronic device being used; and
- providing, using the intermediary device, user lifecycle management for managing profiles and credentials for the groups of user identities tied to the same existing account subscription, authorizing and personalizing access to the media services for multiple individuals under the same account, across multiple devices without affecting the existing account subscriptions, wherein providing user lifecycle management comprises:
  - determining roles for the individual user identities in the groups, in the context of the existing account subscriptions, and storing the roles in the context of the existing account subscriptions;
  - authorizing the creation of new user identities by the primary account holder in the group, in the context of the existing account subscriptions, and storing the new user identities, without affecting the existing account subscriptions;
  - verifying that an identity of a user requesting access to media services matches the stored individual or new user identities and is either a primary account holder or has been indicated as being granted access to the requested media services held in that account by the primary account holder; and
  - upon a successful verification, authorizing the requesting user and granting access to the requested media services.

11. A system for enabling personalization and service coordination of media services across multiple devices, the system comprising a processor and memory, the memory comprising computer executable instructions for:
- providing an intermediary device between a plurality of media services provided by at least one of a network operator and one or more third parties, and electronic devices configured to utilize the plurality of media services;
- interfacing the intermediary device with the electronic devices to determine individual user identities permitted to utilize corresponding media services according to existing account subscriptions for the media services;
- interfacing the intermediary device with at least one network operator entitlement or billing system to determine the existing account subscriptions for the media services;
- interfacing the intermediary device with the plurality of media services to connect the plurality of media services to particular electronic devices according to permissions within groups of user identities under the same existing account subscription, determined by the intermediary device, without affecting the existing account subscriptions;
- providing, using the intermediary device, service orchestration by managing media service sessions for the user identities independent of the electronic device being used; and
- providing, using the intermediary device, user lifecycle management for managing profiles and credentials for the groups of user identities tied to the same existing account subscription, authorizing and personalizing access to the media services for multiple individuals under the same account, across multiple devices without affecting the existing account subscriptions, wherein providing user lifecycle management comprises:
  - determining roles for the individual user identities in the groups, in the context of the existing account subscriptions, and storing the roles in the context of the existing account subscriptions;
  - authorizing the creation of new user identities by the primary account holder in the group, in the context of the existing account subscriptions, and storing the new user identities, without affecting the existing account subscriptions;
  - verifying that an identity of a user requesting access to media services matches the stored individual or new user identities and is either a primary account holder or has been indicated as being granted access to the requested media services held in that account by the primary account holder; and
  - upon a successful verification, authorizing the requesting user and granting access to the requested media services.

12. The system of claim 11, wherein authorizing the requesting user comprises:
- receiving at the intermediary device, a request to access a media service;
- determining a user identity;
- requesting entry of user credentials;
- receiving the user credentials at the intermediary device;
- authenticating the user credentials; and
- providing service credentials to an operator network service to provide access to the requested media service.

13. The system of claim 11, wherein authorizing the creation of new user identities comprises:
- enabling the intermediary device to register user identities;
- receiving a request to create a new user identity; and
- registering the new user identity.

14. The system of claim 13, further comprising instructions for enabling a profile and credentials to be established for the new user identity, and storing the profile and credentials for the new user identity.

15. The system of claim 11, further comprising instructions for:
- receiving account details and media service credentials;
- verifying the account details and the media service credentials with an associated network operator;
- enabling the creation of at least one user identity associated with an operator account;
- enabling the selection of at least one media service to be associated with a user identity receiving at least one media service selection; and
- associating at least one service subscription with the user identity.

16. The system of claim 11, wherein user information and session data are digitally signed to enable comparison of stored digital signatures with new digital signatures generated during different sessions.

17. The system of claim 11, wherein the network operator is any one or more of a communications organization, and a media organization.

18. The system of claim 11, further comprising instructions for interfacing with the existing entitlement or billing system to coordinate consumption of the media services with the existing account subscriptions.

19. The system of claim 11, wherein the user identity is using an application on an electronic device in an online or offline mode, the system further comprising instructions for:
- providing a module on at least one device for interfacing between a device-based application and media services on the devices, and the intermediary;
- enabling the module to communicate with the intermediary and to have the module retrieve and store session and user profile data from the intermediary for at least one service pertaining to an account with the network operator; and
- enabling the module to communicate with the intermediary and to have the module send session and user data from the intermediary.

* * * * *